Jan. 19, 1960 R. ANDERSON ET AL Re. 24,768

FUEL-PUMP CARBURETOR

Original Filed Nov. 24, 1954 3 Sheets-Sheet 1

INVENTORS:
Robert Anderson
and
Paul R. Hunt
BY
Mann, Brown and Hansmann
Att'ys.

FUEL-PUMP CARBURETOR

Original Filed Nov. 24, 1954 3 Sheets-Sheet 2

INVENTORS:
Robert Anderson
and Paul R. Hunt
BY
Mann, Brown and Hansmann
Att'ys

Jan. 19, 1960 R. ANDERSON ET AL Re. 24,768

FUEL-PUMP CARBURETOR

Original Filed Nov. 24, 1954 3 Sheets-Sheet 3

INVENTORS:
Robert Anderson
and
BY Paul R. Hunt

Mann, Brown and Hansmann
Att'ys

United States Patent Office

Re. 24,768

Reissued Jan. 19, 1960

24,768

FUEL-PUMP CARBURETOR

Robert Anderson, Des Plaines, and Paul R. Hunt, Palatine, Ill., assignors, by mesne assignments, to Mission Manufacturing Company, Houston, Tex., a corporation of Texas Original No. 2,801,621, dated August 6, 1957, Serial No. 471,060, November 24, 1954. Application for reissue May 7, 1959, Serial No. 811,770

9 Claims. (Cl. 123—73)

Matter enclosed in heavy brackets [ ] appears in the original patent but forms no part of this reissue specification; matter printed in italics indicates the additions made by reissue.

This invention relates to a fuel pump of the type that is adapted to be mounted on a carburetor and more particularly is concerned with a combination fuel-pump carburetor that may be used with a two-cycle single cylinder, internal combustion engine.

In recent years there has been a noticeable trend in the power tool industry towards inexpensive, compact, lightweight, portable power units, and in harmony with this trend, the present invention has for its principal object to provide a fuel-pump carburetor unit that is compactly arranged, of minimum weight, and inexpensive to manufacture.

In providing such a unit it is proposed to employ an arrangement having fuel filtering means built into the unit and located such that the valves of the fuel supply system are downstream of the filter and, therefore, deal only with fuel that has already been filtered. It is also proposed to provide an arrangement wherein access to the filtering chamber and/or the pumping chamber for purposes of servicing may be had without removing either the carburetor or the fuel lines and attendant fittings.

It is further proposed to actuate the pumping chamber of the unit described above by means of the pressure changes occurring in the crank case of the engine to which the carburetor is attached. In addition, it is proposed to mount the pump on the carburetor in a region of relatively low temperature to forestall the possibility of engine heat vaporizing the fuel and causing an interruption in the flow of the fuel.

Finally, it is proposed to provide a unit of the type described above such that a bare minimum of change is required to convert a two-cycle engine originally designed for use with a gravity feed type of unit to permit its use with the present unit which employs a pressure feed.

Other objects and advantages of the invention will be apparent during the course of the following description.

In the accompanying drawings forming a part of this specification and in which like numerals are employed to designate like parts throughout the same:

Basically, the present invention contemplates the provision of a carburetor casing having an open-ended chamber that is adapted to receive a fuel filtering unit. The pumping chamber of a fuel pump is built into the cover assembly for the open-ended chamber and the filtering unit, mentioned above, is preferably secured to and carried by the cover assembly. It should be understood that this arrangement may be employed with any type of carburetor and that the particular mode of operation of the carburetor illustrated herein is not intended to limit the scope of the present invention beyond the express limitations of the appended claims.

Figure 7:
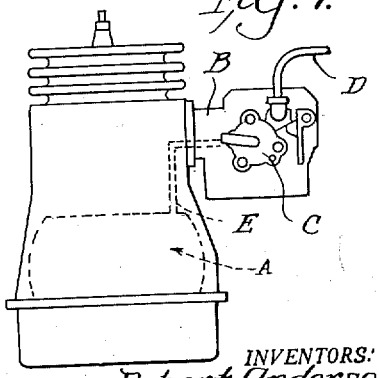
Fig. 7 is a diagrammatic view illustrating the relationship between the fuel-pump carburetor unit and a two-cycle engine.

Referring now to Fig. 7, there is illustrated therein a complete assembly of a two-cycle internal combustion engine A, a carburetor B mounted directly on the engine, and a fuel pump C secured to the side of the carburetor. According to the present invention, the fuel pump which supplies fuel to the induction passage of the carburetor is driven by the pressure changes occuring in the crank case of the internal combustion engine A. A glance at Fig. 7 points up one of the principal advantages of the present arrangement in that the only external connection that is required is the input fuel line D, all other necessary connections being internal. In this respect it should be noted that the input fuel line D is connected to the casing of the carburetor and not to the fuel pump, and thus there are internal incoming and outgoing passageways between the carburetor and the pumping chamber of the fuel pump which place the fuel pump in a fuel supply circuit that includes the fuel inlet D. In addition, there is an internal passage E, shown in dotted lines, which connects the pressure chamber of the fuel pump C with the crank case pressures of the engine A. Because the fuel inlet D is connected to the carburetor, it is possible to dismantle the fuel pump without disturbing the inlet fuel connection. This not only simplifies the servicing and maintenance procedures, but also preserves the useful life of the inlet fuel fitting by avoiding the necessity of frequently removing the same.

Figure 3:
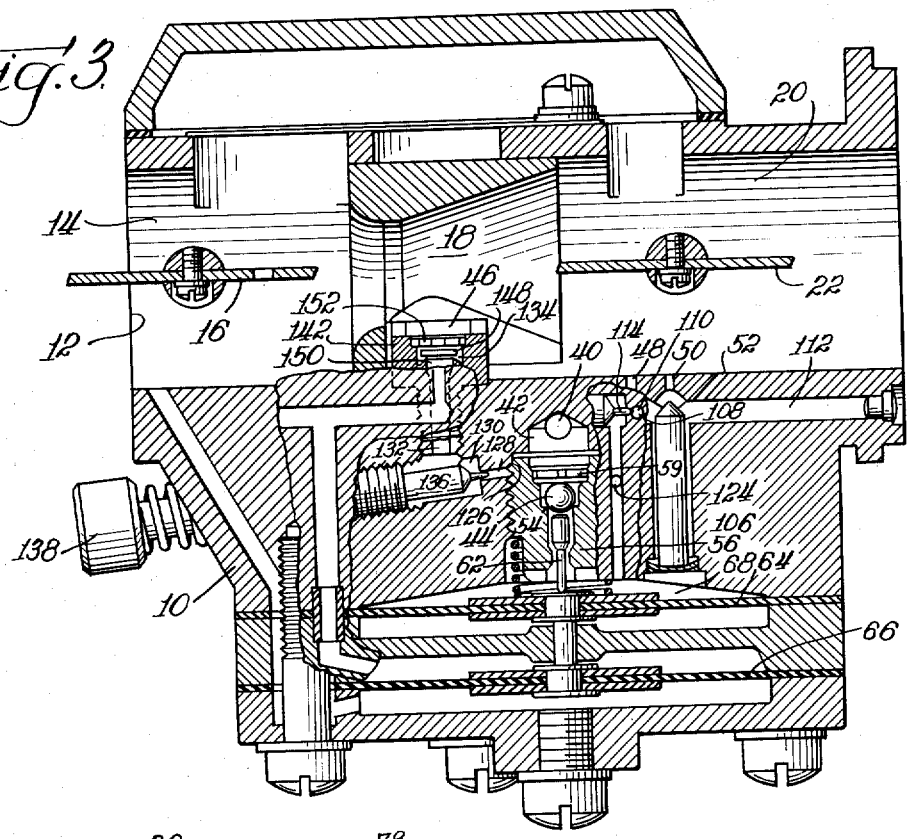
Fig. 3 is a vertical sectional view of the carburetor itself and is taken along the line 3—3 of Fig. 2.

For convenience of disclosure, there is illustrated in Fig. 3 a carburetor which corresponds generally to the all-position carburetor illustrated and described in a copending application of Robert F. Bracke, Serial No. 280,321, filed April 3, 1952, now Patent No. 2,774,582. No detailed description of this carburetor is believed necessary nor will one be provided; however, it is desirable to point out the principal parts that relate to the present invention and the operation thereof.

The carburetor has a body or casing 10 provided with an induction passage consisting of an air inlet 12 communicating with a choke bore 14 containing the usual choke valve 16. A Venturi 18 is disposed between the choke bore 14 and a throttle bore 20, the latter containing a throttle valve 22.

A fuel passage 40 located downstream of the fuel pump, as will be described more fully hereinafter, communicates with the upper end of a main fuel-valve chamber 42. A main fuel valve 44 controls communication between the chamber 42 and passages leading to the main fuel jet 46 and idle jets 48, 50, and 52. This main fuel valve 44 is in the form of a free ball of metal or other suitable material and normally rests upon a valve seat 54 provided by a valve seat member 56 threadedly attached to the main body 10 of the carburetor. A perforated washer 59 located in the upper end of the valve seat member 56 limits movement of valve 44 away from its seat 54.

When the carburetor is in the normal position, as shown in the drawing, the main fuel valve 44 is urged toward its seat 54 by gravity and also by the flow of fuel when the engine is operating. This valve is moved away from its seat by a push rod 62 which is under the control of a pair of diaphragms 64 and 66. The particular function of the diaphragms 64 and 66 is in no way related to the present invention and need not be further described.

The fuel valve 44 controls flow of fuel from the chamber 42 to the upper part of the upper diaphragm chamber 68 which communicates with the idle jets 48, 50, and 52 by way of passages 106, 108, 110, and 112. A needle valve 114 regulates flow between passages 108 and 110 to control the flow of fuel to the idle jets 48, 50, and 52. The main fuel valve 44 also controls the flow of fuel to the main jet 46. Communication between the main fuel jet 46 and the upper portion of diaphragm chamber 68 is provided by bores 106 and 124, annular space 126, bores 128, 130, and 132, and valve chamber 134. A needle valve 136 controls communication between bores 128 and 130 so that the flow of fuel to the main jet 46 can be regulated by turning the knurled handle 138 of needle valve 136. The valve chamber 134 is located in a valve housing 142 threadedly attached to the carburetor body 10. A disc valve 148 is located in the valve chamber 134 and is freely movable between a seat 150 and a triangular retainer 152 provided with a central opening through which the fuel may pass to the Venturi 18.

Figure 1:
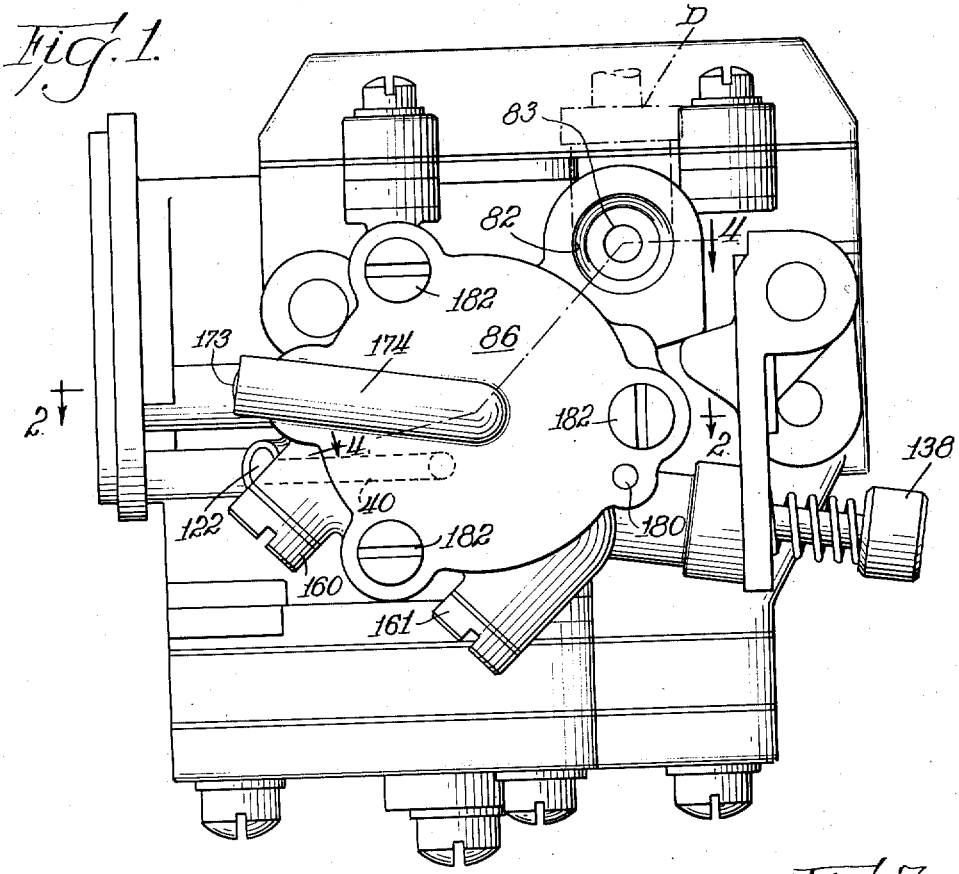
Fig. 1 is a side view showing a fuel pump mounted on the side of a carburetor.
Figure 2:
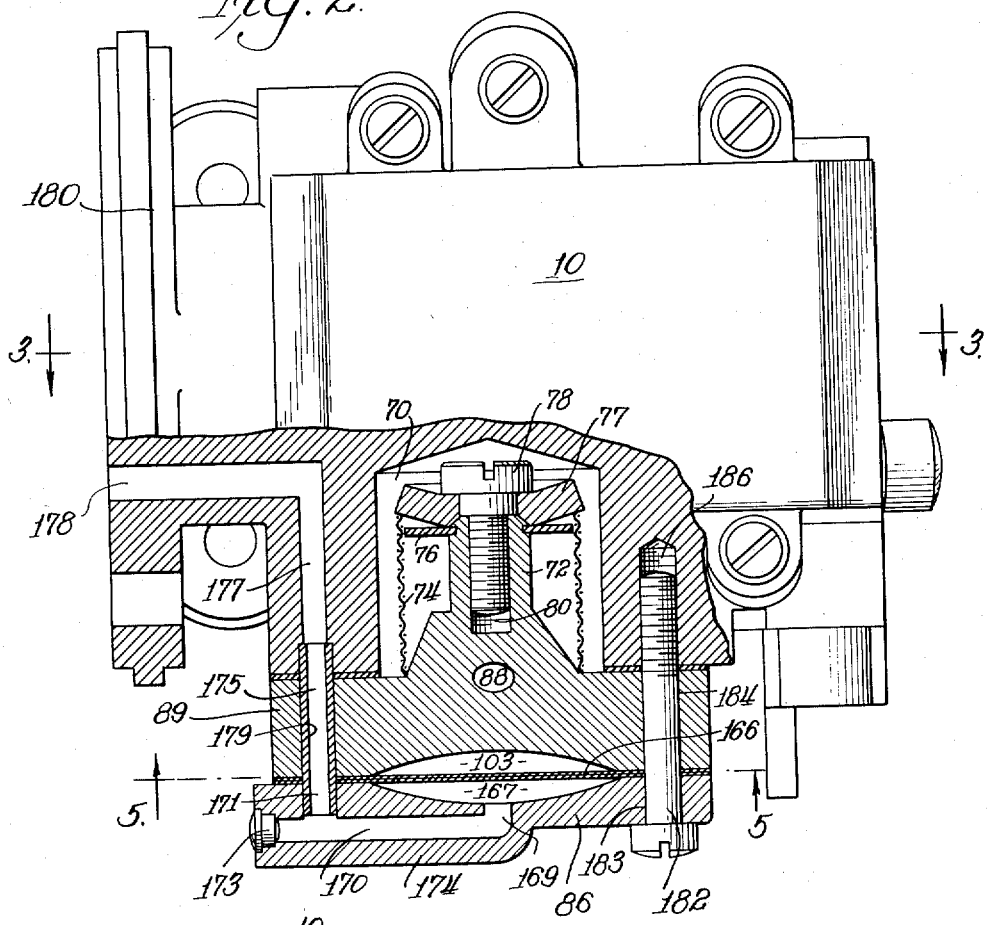
Fig. 2 is a top view of the unit of Fig. 1 and is partly in section, the section being taken along the line 2—2 of Fig. 1.

In order to understand the relative relationship of the carburetor parts of Fig. 3 to the filter chamber and fuel-pump assembly, reference should be had to Figs. 1, 2 and 3. The fuel pump C has already been described as being positioned on a side portion of the carburetor casing and thus it should be understood that the fuel filtering chamber shown in Fig. 2 extends laterally inwardly toward the induction passage of the carburetor. The parts of the carburetor proper, as shown in the vertical sectional view of Fig. 3, are positioned beneath the induction passage. Thus the carburetor casing is of a somewhat irregular shape and the internal fuel passage 40 extends from the lateral regions of the casing, adjacent the filter chamber, to the underneath regions of the casing where it communicates with the main fuel-valve chamber 42, as previously described.

According to the present invention, the casing 10 is formed with an open-ended cylindrical chamber 70 and several open-ended passageways. A fuel-pump assembly, also including several open-ended passageways adapted to cooperate with the open-ended passageways of the casing, is employed to seal the open end of the chamber 70 and to provide a fuel supply system and a pressure supply system for pumping fuel itno the carburetor.

The particular arrangement and construction of the fuel-pump assembly and the method for securing it to the carburetor casing 10 offer important additional advantages in that it greatly simplifies the servicing and maintenance problems. In this connection, an outer plate 86, which acts as a pump cover, and an inner plate 89, which acts as a filter cover, are fastened together in a semi-permanent manner by a pin 180, shown in Figs. 1 and 5, which extends between cooperating bores formed in each of the plates. This cover plate assembly is positioned on the casting such that the filtering means projects within the filtering chamber 70 and the adjacent portions of the inner cover plate seal the filtering chamber and is secured in this position by means of three bolts, each designated by reference character 182. The bolts extend through cooperating bores 183 and 184 formed in the outer and inner cover plates, respectively, and threadedly engage tapped bores 186 suitably located in the carburetor casing 10. Thus, when it is desired to dismantle the fuel-pump carburetor unit, the bolts 182 are first removed. This permits the entire fuel pump and filter assembly to be detached, and this may be done without disengaging the input fuel line D of Fig. 7. During this operation, the pin 180 will maintain the outer and inner cover plates in assembled relationship. Since the most frequent maintenance problems are concerned with the filter portion rather than the fuel pump itself, it is desirable to maintain the assembled relationship of the cover plates; however, if it should also be necessary to service the fuel-pump portion of the device, access may be had thereto by dislodging the retaining pin 180.

The fuel-pump assembly C includes a stepped boss 72 adapted to project into the chamber 70 when the fuel pump is in position on the casing 10 of the carburetor. This boss provides a convenient mount for the filtering means of the present invention which includes a cylindrical wire screen 74 that is positioned about the periphery of a washer 76. The washer 76 is staked to the boss 72 and helps to support a rubber washer 77 which is urged downwardly by the head of a bolt 78. The bolt 78 is threadedly engaged in a tapped bore 80 formed in the boss 72, and through the medium of the rubber washer 77 acts upon the edges of the cylindrical screen 74 to hold the screen in place.

Figure 5:
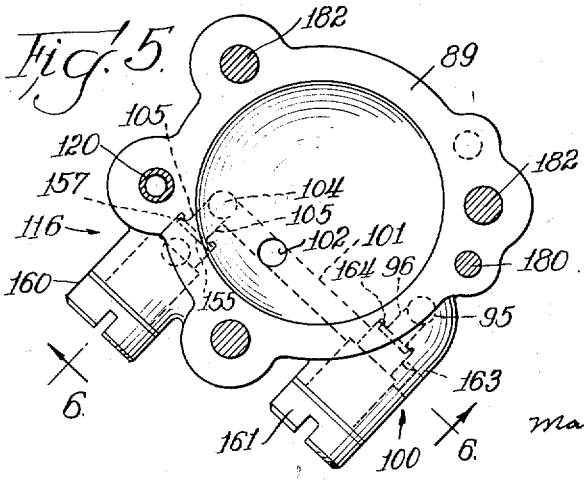
Fig. 5 is a face view of the fuel pump and is taken along the line 5—5 of Fig. 2.
Figure 6:
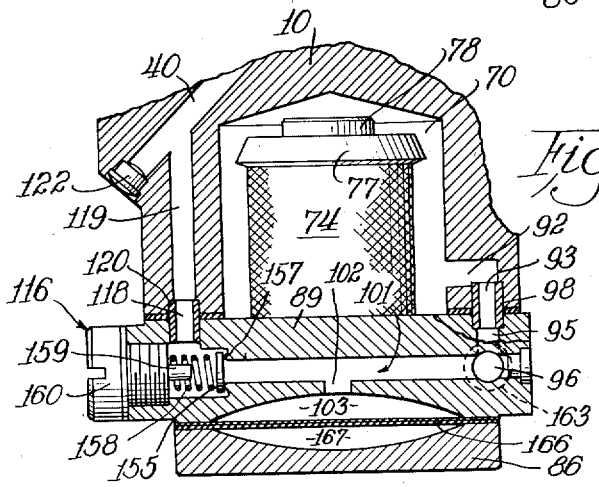
Fig. 6 is a developed sectional view taken along the line 6—6 of Fig. 5 illustrating the pumping action and the connection from the filter chamber to the carburetor.
Figure 4:
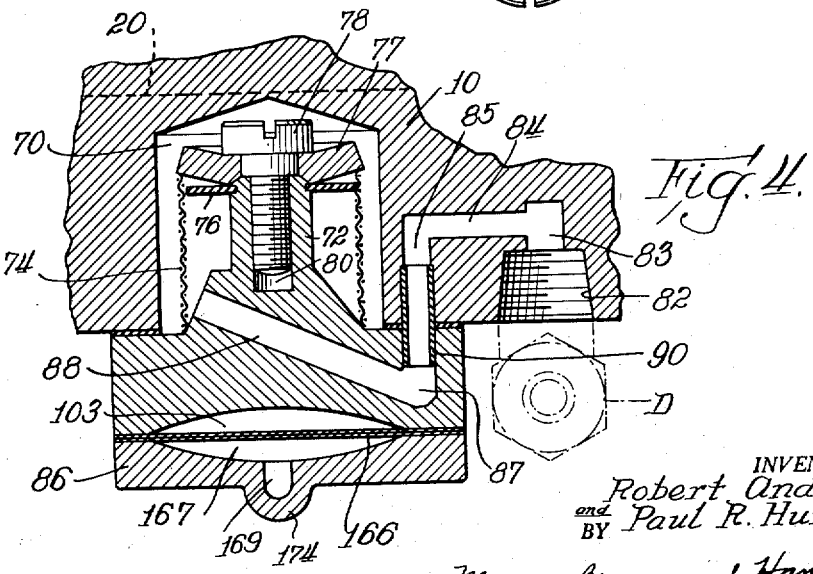
Fig. 4 is a sectional view along the line 4—4 of Fig. 1 and illustrates the fuel inlet portion and filter portion of the fuel supply system.

The fuel supply system of the fuel-pump carburetor unit is shown in Figs. 4, 5, and 6 and includes a conventional tapped inlet 82 that communicates with successive bores 83, 84, and 85 formed in the casing 10, the bore 85 terminating at the surface portion of the carburetor casing immediately adjacent the filter chamber 70 and constituting one of the open-ended passageways referred to above. The bore 85 is adapted to communicate with similar successive bores 87 and 88 that are formed in the inner cover plate 89. The necessary fluid-tight connection between bores 85 and 87 is facilitated by a pilot collar 90. The bore 88 extends into the boss 72 to communicate with the inside of the fuel filtering means. Thus, the fuel passes through the filter from the inside to the outside, and from the maintenance standpoint this is a desirable arrangement since the material that is filtered out will be collected within the filter to facilitate its removal.

As shown in Fig. 6, the casing 10 also includes successive bores 92 and 93, bore 92 being in communication with the outer regions of the filter chamber and bore 93 terminating at the surface portion of the casing immediately adjacent the filter chamber 70. Thus, bore 93 is also an open-ended passageway and communicates with successive bores 95 and 96 formed in the inner cover plate 89. A pilot collar 98 facilitates the necessary fluid-tight communication between bores 93 and 95. Bore 96 feeds into an inlet valve chamber 100 and thence into a bore 101. Adjacent the center of its axial length, the bore 101 communicates with a pumping bore 102 which feeds directly into the pumping chamber 103. At its other end, the bore 101 communicates with successive bores 104 and 105 also formed in the inner cover plate 89, the bore 105, in turn, communicating with an outlet valve chamber 116. An open-ended bore 118 extends from the outlet valve chamber 116 to the surface of the inner cover plate 89 where it is adapted to communicate with an open-ended bore 119 formed in the casing 10, a pilot collar 120 being employed to facilitate the necessary fluid-tight connections between bores 118 and 119. The open-ended bore 119 of casing 10 feeds into the fuel passage 40 previously referred to. The passage 40 is a diagonal bore extending from a surface portion of the casing 10, as shown in Fig. 6, to the main fuel valve chamber 42, as shown in Fig. 3. This bore is sealed by a small lead ball 122. The bore 40 is also indicated by dotted lines in Fig. 1.

The remainder of the fuel supply system is shown in Fig. 3 and consists of the main fuel-valve chamber 42, upper diaphragm chamber 68, bores 106 and 124, annular space 126, bore 128, etc. The inlet and outlet valve chambers are located upstream and downstream, respectively, of the pumping chamber 103 and they are of identical construction. As shown in Fig. 6, the outlet valve assembly consists of a valve disc 155 that may be made of plastic, metal, or fabric and that is adapted to cooperate with an annular valve seat 157 that surrounds one end of the bore 105. The disc 155 is urged toward the seat 157 by a spring 158 that is telescoped over a projecting stop rod 159 formed on a screw-threaded plug 160. The stop 159 limits the opening travel of the valve disc 155 and the plug 160 serves to seal the valve chamber 116. The inlet valve chamber 100 is sealed by a similar plug 161 and contains a similar valve disc 163 that cooperates with an annular valve seat 164 surrounding the passageway 96. The fuel pump is formed between the outer cover plate 86 and the inner cover plate 89. The outer plate 86 is dished outwardly and the inner plate 89 is dished inwardly to form a hollow chamber, and a diaphragm 166 is mounted between the plates 86 and 89 to divide the hollow chamber into an outer pressure chamber 167 and the inner pumping chamber 103 previously described.

The pressure supply system for the pressure chamber 167 is shown in Fig. 2 and includes successive bores 169, 170, and 171 formed in an outwardly-projecting boss 174 of the outer cover plate 86. The bore 170 extends to a surface portion of the outer plate 86 and is sealed by a small lead ball 173. The bore 171 is tapped off of bore 170 and terminates as an open-ended bore that is adapted to communicate with a bore 175 formed in the inner cover plate. The bore 175 is open at both ends and is also adapted to communicate with successive bores 177 and 178 formed in the carburetor casing 10. Preferably, a single pilot collar 179 projects from opposite ends of the bore 175 to provide a fluid-tight connection from bore 171 to bore 177. The bore 178 emerges at the mounting flange 180 of the carburetor and is adapted to communicate with the passageway E formed in the engine A, as shown in Fig. 7. This passageway is in direct communication with the crank case pressures and thus completes the entirely internal pressure supply system of the present invention.

Any standard two-cycle internal combustion engine can readily be converted for use with the fuel-pump carburetor unit of the present invention by modifying it to incorporate a passageway E extending between the crank case and the mounting surface that contacts the mounting flange 180 of the carburetor.

The operation of the device is simple and efficient. Pressure chamber 167, as previously explained, communicates with the crank case of the internal combustion engine by way of bores 169, 170, 171, 175, 177, 178, and E, and thus is subject to the crank-case pressures. During the compression stroke of a two-cycle engine, there is a negative pressure in chamber 167 and the diaphragm 166 flexes outwardly causing the chamber 103 to expand. This lowers the pressure in chamber 103 causing valve 116 to close and valve 100 to open. This lower pressure in chamber 103 also causes fuel to be drawn from the fuel tank (not shown) through the fuel inlet 82, bores 83, 84, 85, 87, and 88, filter 74, bores 92, 93, 95, 96, and 101, and into chamber 103.

During the power stroke, there will be a positive pressure in chamber 167 thus flexing the diaphragm 166 inwardly. This causes valve 100 to seat and opens valve 116 allowing the fuel in chamber 103 to pass through bores 101, 104, 105, 118, 119, and 40 to the main fuel valve chamber 42. The remainder of the fuel supply system is concerned solely with the carburetor, which may be of any type. It may be seen from the above-described operation that the fuel is subjected to the action of the filter before it encounters the valves 100 and 116, and thus these valves handle only filtered fuel. This is an important advantage of the present device in that the valve discs 155 and 163 are extremely delicate and susceptible to being fouled by even the slightest impurities.

Thus, the objects of the present invention have been accomplished in that the fuel-pump carburetor unit of the present invention is of a highly compact construction requiring no external connections, being easily dismantled for servicing, and being inexpensive to manufacture.

It should be understood that the description of the preferred form of the invention is for the purpose of complying with Section 112, Title 35 of the United States Code, and that the appended claims should be contrued as broadly as the prior art will permit.

We claim:

1. The combination with a two-cycle internal combustion engine having a carburetor casing mounted thereon, of an air pressure operated fuel pump secured directly to the side of said casing, said pump being connected to the crank case of said engine by successive communicating internal air pressure passageways in said pump, said casing, and said engine.

2. In a fuel supplying device for a two-cycle internal combustion engine, the combination of a casing having a filter chamber open on one face of said casing, said casing having an induction passage for carbureted air, with a fuel pump assembly including a filter removably mounted on said face in sealing relation to said chamber and said face, a fuel inlet in said casing and internal fuel passageways connecting said fuel inlet and fuel-pump assembly through said face with said induction passage, a pump chamber in said fuel pump assembly, a diaphragm in said pump chamber, an internal air passageway from said pump chamber extending into said casing through said face for connection to the crankcase of said internal combustion engine whereby said diaphragm may be actuated by crankcase pressures, means releasably securing said fuel pump assembly to said face, said fuel pump assembly being removable as a unit on release of said securing means.

3. In a fuel supply system for a two-cycle internal combustion engine having a crankcase from which carbureted air is transferred to the engine cylinders, a carburetor casing joined to said crankcase, and including a carbureted air intake housing, an internal fuel delivery passage joining said housing and an exterior face of said casing, an internal fuel supply passage in said casing terminating at said exterior face, an internal air passage in said casing communicating between said crankcase and said exterior face, a crankcase pressure operated fuel pump removably mounted on said exterior face of said casing in fluid tight relation, said pump having internal fluid inlet and delivery bores and an air bore registering with respective passages in said casing, a diaphragm chamber and a diaphragm in said fuel pump, said air bore communicative with one side of said diaphragm chamber to subject said diaphragm to crankcase pressure for actuation thereof, a conduit in said fuel pump exposed to the opposite side of said diaphragm chamber and joining said fuel inlet bore and said fuel delivery bore, and valve means in said bores enforcing a one-way fuel flow through said fuel pump, said valve means being removable from the exterior of said pump without disassembly of said pump.

4. Apparatus according to claim 3, comprising a fuel filter in said pump between said inlet fuel bore and said conduit.

5. In a two-cycle internal combustion engine having a crankcase from which carbureted air is transferred to the engine cylinders, a carburetor casing fixed to said crankcase and having an induction housing for carbureted air communicating with said crankcase, an air passage in said casing communicating between said crankcase and one exterior face of said casing, a fuel delivery passage in said casing joining said face and said housing, an inlet fuel passage in said casing terminating at said face, an integral fuel pump removably mounted on said face in fluid-tight relation thereto, said fuel pump having an air bore, a fuel delivery bore and a fuel intake bore registering with corresponding passages in said casing, a diaphragm chamber in said pump, a diaphragm in said chamber, said chamber on one side of said diaphragm communicating with said air bore whereby said diaphragm is subjected to crankcase pressure for actuation thereof, a fuel conduit in said pump joining said fuel inlet and delivery bores, said conduit communicating with the opposite side of said diaphragm, and removable valve means in said bores accessible from the exterior of said pump.

*6. Fuel supply apparatus for an internal combustion engine comprising a body structure having an induction conduit and an outlet portion, a fuel chamber in said structure adjacent said conduit, a fuel duct connecting said chamber and conduit, a gaseous-pressure-operated fuel pump mounted at the side of said structure, said pump including pumping and pressure chambers and a pumping element separating the same, said pressure chamber being connected to said fuel chamber by a delivery passage, and a pump operating, gaseous fluid transmitting passage extending from said pumping chamber through said carburetor body structure to said outlet portion for connection to a source of pulsating fluid pressure.*

*7. All position fuel supply apparatus for an internal combustion engine comprising compact body structure having an induction conduit with an outlet portion constructed for attachment to an engine, a fuel chamber in said structure at the side of said conduit, a fuel regulating diaphragm forming one wall of said chamber, a fuel supply duct connecting said fuel chamber and said conduit, a pumping diaphragm mounted at the side of said conduit in compact relationship with the same and with said first diaphragm, pumping and pressure chambers on opposite sides of said pumping diaphragm, a delivery passage connecting said pressure and fuel chambers, and a passage for transmitting fluid pressure pulsations extending from said pumping chamber through said casing to said outlet portion for connection to the engine.*

*8. All position fuel supply apparatus for an internal combustion engine comprising a plurality of interconnected members, one of said members being formed with a mixing passage and an unvented fuel chamber, a first diaphragm forming a wall of said fuel chamber, orifice means for delivering fuel from said chamber into said mixing passage, a fuel pump supported entirely by and compactly arranged with respect to said first member*

*comprising a diaphragm disposed between two of said members, both of said diaphragms being substantially parallel to the axis of said mixing passage, the regions of said members adjacent said second diaphragm being shaped to provide with said second diaphragm a fuel pressure chamber and a pulsing chamber, a pulsation passage extending from said pulsing chamber through said first member for connection to the engine crankcase, a duct arranged to connect said pressure chamber to a source of fuel supply, a second duct connecting said pressure chamber with said fuel chamber, a control valve in said second duct, means in said fuel chamber operatively connecting said first diaphragm and said control valve, spring means normally urging said control valve closed, and check valves in said ducts for effecting flow of fuel from the supply through said pressure chamber under the influence of pulsating fluid pressure acting on said second diaphragm.*

*9. The combination with a two-cycle internal combustion engine having a carburetor casing mounted thereon of an air pressure operated fuel pump secured directly to the side of said casing, said pump including a pumping diaphragm and pulsation and fuel pressure chambers on opposite sides thereof all intimately arranged with respect to said casing, said pulsation chamber being connected to the crankcase of said engine by successive communicating internal air pressure passageways in said pump, said casing, and said engine.*

References Cited in the file of this patent or the original patent

UNITED STATES PATENTS

| | | |
|---|---|---|
| 1,022,803 | Troutt | Apr. 9, 1912 |
| 1,788,647 | Wheeler | Jan. 13, 1931 |
| 1,799,434 | Muzzy | Apr. 7, 1931 |
| 1,853,811 | Hewitt | Apr. 12, 1932 |
| 1,896,499 | Tice | Feb. 7, 1933 |
| 1,961,561 | Tice | June 5, 1934 |
| 2,598,147 | Tescher | May 27, 1952 |
| [2,713,354 | Conover | July 26, 1955] |
| *2,713,854* | *Conover* | *July 26, 1955* |